July 15, 1930.　　W. N. GILBERT　　1,770,610
SCALE
Filed Oct. 31, 1927
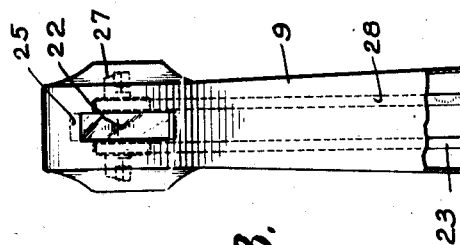
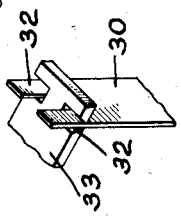
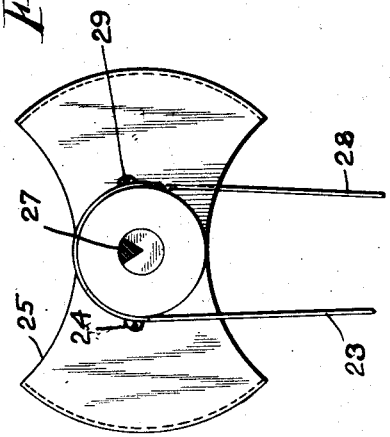
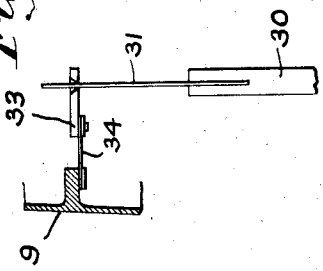
INVENTOR
William N. Gilbert
BY
ATTORNEY Patented July 15, 1930

1,770,610

UNITED STATES PATENT OFFICE

WILLIAM N. GILBERT, OF HUDSON HEIGHTS, NEW JERSEY, ASSIGNOR TO DAYTON SCALE COMPANY, OF DAYTON, OHIO, A CORPORATION OF NEW JERSEY

SCALE

Application filed October 31, 1927. Serial No. 229,924.

This invention relates broadly to scales and more particularly to scales of the even balance type incorporating an indicator with multiplying connections to assist in recognizing the balance condition of the scale beam.

The invention also concerns a scale of the even balance type wherein neither the accuracy of the beam nor the accuracy of the indicator will be impaired by the tilting of the scale base.

An object of the invention is to provide a scale of this type in which improved and simplified multiplying connections are provided intermediate the scale beam and the indicator.

Another object is to provide a scale of this type wherein a single resilient means mounted directly on the scale beam is provided for holding the indicator and beam in normal zero position.

Another object is to provide an even balance scale having a single tension means of which one element is mounted directly on the scale beam for holding the indicator and beam in normal zero position.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the accompanying drawings I have shown for the purpose of illustration one form of mechanism embodying the invention in which—

Fig. 1 is a front elevation of my scale with certain parts shown in section.

Fig. 2 is a detail of the drum and manner in which the steel tapes are secured thereon.

Fig. 3 is an enlarged detail of the resilient means for maintaining the indicator and beam in normal position.

Fig. 4 is an enlarged side elevation of the above resilient means.

The preferred form of the invention contemplates an even balance scale in which a drum or sector carrying graduations may cooperate with an index mark or wire on casing of the scale. The drum is mounted on frictionless bearings and connected to the scale beam through simple multiplying connections including steel tapes which revolve the drum or sector in accordance with the movement of the balance beam. A resilient member is provided for holding the drum in its normal or zero position with respect to the index mark or wire regardless of whether the scale base is level or slightly tilted. The resilient member also forms a load offsetting means by which slight over and under weights may be accurately indicated on the drum or sector.

Referring to Fig. 1, the scale includes a base or support 8, a casing 9 and a balance beam 10 fulcrumed on knife edges 11 on a bearing 12. The scale is provided with the usual tare beam and adjustable tare poise 14. The beam, as is customary in scales of the even balance type, carries at one end a weighing pan or plate 16 and at its opposite end a similar plate 15 for the well known counter weights to bring the beam in balance when a commodity to be weighed has been placed thereon. These two plates are mounted on the beam 10 in the well known manner on knife edges 17 and 18 and are provided with downwardly extending stems 19 and 20 which may be connected to a check mechanism to retain the plates in parallel positions at all times.

Fixed to the plate 15 is an arm 21 having connected to its free end a steel tape 23, the opposite end of the tape being anchored by a screw 24 to a hub or sector on the left side of the drum 25 as viewed in Fig. 1. An arm 26, similar to arm 21 and fixed to the plate 16 likewise carries a steel tape 28 in its free end, the opposite end of which is also fixed by a screw 29 to a hub or sector on the right side of the drum 25 as viewed in Fig. 1. The drum 25 is fulcrumed on knife edges 27 and revolves in accordance with the movement of the scale beam 10 through the medium of the above arms and tapes. Owing to the fact that the radius of the drum is considerably greater than that of the sectors or hubs with which the tapes 23 and 28 coact a substantial multiplication of the movement of the drum over that of the scale beam is provided.

Fixed on the balance beam 10 is a vertically extending arm 30 carrying in its upper end a steel spring 31 (Figs. 1, 3 and 4) bifurcated at its upper end to normally engage a plurality of beveled notches 32 in a member 33 held in position by a spring 34 fixed at its opposite end to the scale casing 9, (Fig. 4).

It will be seen from Fig. 1 that when a commodity to be weighed is placed on one end of the balance beam 10 and counterbalanced by a weight on the other end thereof that the beam in assuming its neutral position will rotate the drum 25 with a multiplied motion thereby assisting the operator in determining the balance position of the beam. During the movement of the beam the spring 31 will be flexed forming a load offsetting means by which slight over and under weights may be indicated on the drum 25 as well as holding the drum in its zero position when the scale is out of level.

What is claimed is:

1. A scale of the even balance type comprising a balance beam fulcrumed intermediate its ends, weight holding members mounted on the beam on opposite sides of the fulcrum thereof, and means for resiliently holding the beam in balance position consisting of a resilient member mounted on the beam and a fixed coacting member, with a resilient connecting element between the two members.

2. A scale of the even balance type comprising a balance beam, a leaf spring rigidly mounted on the balance beam and a fixed member freely engaging the spring to tension the same on movement of the beam from its balance position.

3. A scale of the even balance type comprising a balance beam, a leaf spring mounted on the beam and a spring supported member pivotally engaging the spring to tension the same on movement of the beam from its balance position.

4. A scale of the even balance type comprising a balance beam, an arm fixed to the beam carrying a leaf spring and means for constraining the end of the spring to tension the same on movement of the beam from balance position.

5. A scale of the even balance type comprising a pivoted balance beam, an arm mounted on the beam above its pivot and extending upwardly therefrom, a leaf spring fixed at one end in the free end of said arm and means for restraining the other end of said spring from movement to tension the same on movements of the balance beam from balance position.

6. A scale of the even balance type comprising a pivoted balance beam, an indicator drum mounted with its axis parallel to the beam, a pair of flexible connections attached to the beam on opposite sides of its pivot and to the drum on opposite sides of its axis to positively move the drum on movement of the scale beam from its balance position in either direction.

7. A scale of the even balance type comprising a pivoted balance beam, an indicator drum mounted with its axis parallel to the beam, sectors on said drum and a pair of flexible connections attached to the beam on opposite sides of its pivot and to the drum sectors at opposite sides of the drum axis to positively move the drum on movement of the scale beam from its balance position in either direction.

8. A scale of the even balance type comprising a balance beam carrying a plurality of pivot members, platforms supported on said pivot members, means for resiliently holding the beam in balance position consisting of a resilient member mounted on the beam and a coacting member with a resilient connecting element between them and indicating means associated with the beam for indicating movement of the same from its balance position in either direction.

9. A scale of the even balance type comprising a balance beam, means for resiliently holding the same in balance position consisting of a member mounted on the beam and a fixed coacting member with a resilient connection between them, a pivoted indicating drum and a pair of flexible connections connected to the beam on opposite sides of its pivot and to the drum at opposite sides of its axis to displace the drum in opposite directions on movement of the beam in opposite directions from its balance position.

In testimony whereof I hereto affix my signature.

WILLIAM N. GILBERT.